United States Patent [19]

Wainauski et al.

[11] Patent Number: 4,834,617
[45] Date of Patent: May 30, 1989

[54] AIRFOILED BLADE

[75] Inventors: Harry S. Wainauski, Simsbury, Conn.; Carol M. Vaczy, Strubridge, Mass.

[73] Assignee: United Technologies Corporation, Hartford, Conn.

[21] Appl. No.: 225,587

[22] Filed: Jul. 26, 1988

Related U.S. Application Data

[63] Continuation of Ser. No. 92,500, Sep. 3, 1987, abandoned.

[51] Int. Cl.[4] .............................................. B64C 11/18
[52] U.S. Cl. ................................ 416/242; 416/DIG. 2
[58] Field of Search ............ 416/223 R, DIG. 2, 242, 416/243, 238; 415/181; 244/35 R, 35 A

[56] References Cited

U.S. PATENT DOCUMENTS

| | | | |
|---|---|---|---|
| 3,952,971 | 4/1976 | Whitcomb | 244/35 R |
| 4,325,675 | 4/1982 | Gallot et al. | 416/DIG. 2 X |
| 4,412,664 | 11/1983 | Noonan | 416/223 R X |
| 4,413,796 | 11/1983 | Bousquet | 416/DIG. 2 X |
| 4,455,003 | 6/1984 | Hilbig | 244/35 R |
| 4,519,746 | 5/1985 | Wainavski et al. | 416/223 R |
| 4,611,773 | 9/1986 | Goldhammer et al. | 244/35 R |
| 4,652,213 | 3/1987 | Thibert et al. | 416/DIG. 2 X |

Primary Examiner—Robert E. Garrett
Assistant Examiner—Joseph M. Pitko
Attorney, Agent, or Firm—Lloyd D. Doigan

[57] ABSTRACT

A blade has a plurality of relatively thick, super critical airfoil sections, each section having a parabolic leading edge, with a slight camber extending to about a 40% chord, a gradual upper surface pressure recovery region from the 40% chord to the trailing edge, and a concave lower surface from the 40% chord to the trailing edge to generate required lift. The sections, which have a thickness ratio from about 2% to 7.5%, each have a maximum thickness at approximately 0.36 x/c and a maximum camber at approximately 0.74 x/c, wherein x/c is a dimensionless length along the chord of each of said airfoil sections.

1 Claim, 6 Drawing Sheets

AIRFOILED BLADE

This application is a continuation of Ser. No. 092,500, now abandoned.

TECHNICAL FIELD

This invention relates to a propeller blade having a plurality of particular airfoil cross-sections.

BACKGROUND ART

Some propellers such as the prop fan, utilize thin swept blades. The shape of the airfoils defining the blades allows high power loading with minimized compressability losses. For instance, the prop fan blades manufactured by the Hamilton Standard Division of the United Technologies Corporation each have a power loading of approximately 37.5 shp/d$^2$. Such thin swept blades allow a prop fan propeller to achieve a peak efficiency of over 80% at a 0.8 flight Mach number a tip speed of 800 feet per second, and an altitude of 35,000 feet.

The blades must be designed to perform reliably at such high tip speeds and Mach numbers. However, thin, swept blades comprised of, for instance, NACA Series 16 airfoils have several design constraints. The shape of the leading edge of such airfoils makes a blade susceptible to foreign object damage. The shape of the trailing edge makes the blade very difficult to handle. The thin nature of the blade makes the blade difficult to construct.

DISCLOSURE OF THE INVENTION

It is an object of the present invention to create a blade having airfoil cross-sections that provide high loading and high efficiency at relatively high Mach numbers.

It is an object of the invention to create a blade having airfoil cross-sections that are less susceptible to foreign object damage.

It is an object of the invention to create a blade having airfoil cross-sections that are easy to handle and construct.

According to the invention, a blade has a plurality of relatively thick, super critical airfoil sections, each section having a parabolic leading edge, with a slight camber extending to about the 40% chord, a gradual upper surface pressure recovery region from the 40% chord to the trailing edge, and a concave lower surface from the 40% chord to the trailing edge to generate the required lift.

According to a feature of the invention, the airfoil sections have a thickness ratio (h/b) ranging from 2 to 7.5%. As such, the novel blade of the invention provides similar aerodynamic performance to the NACA Series 16 airfoil with less susceptibility to foreign object damage, less handing problems, more strength, and less construction problems.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
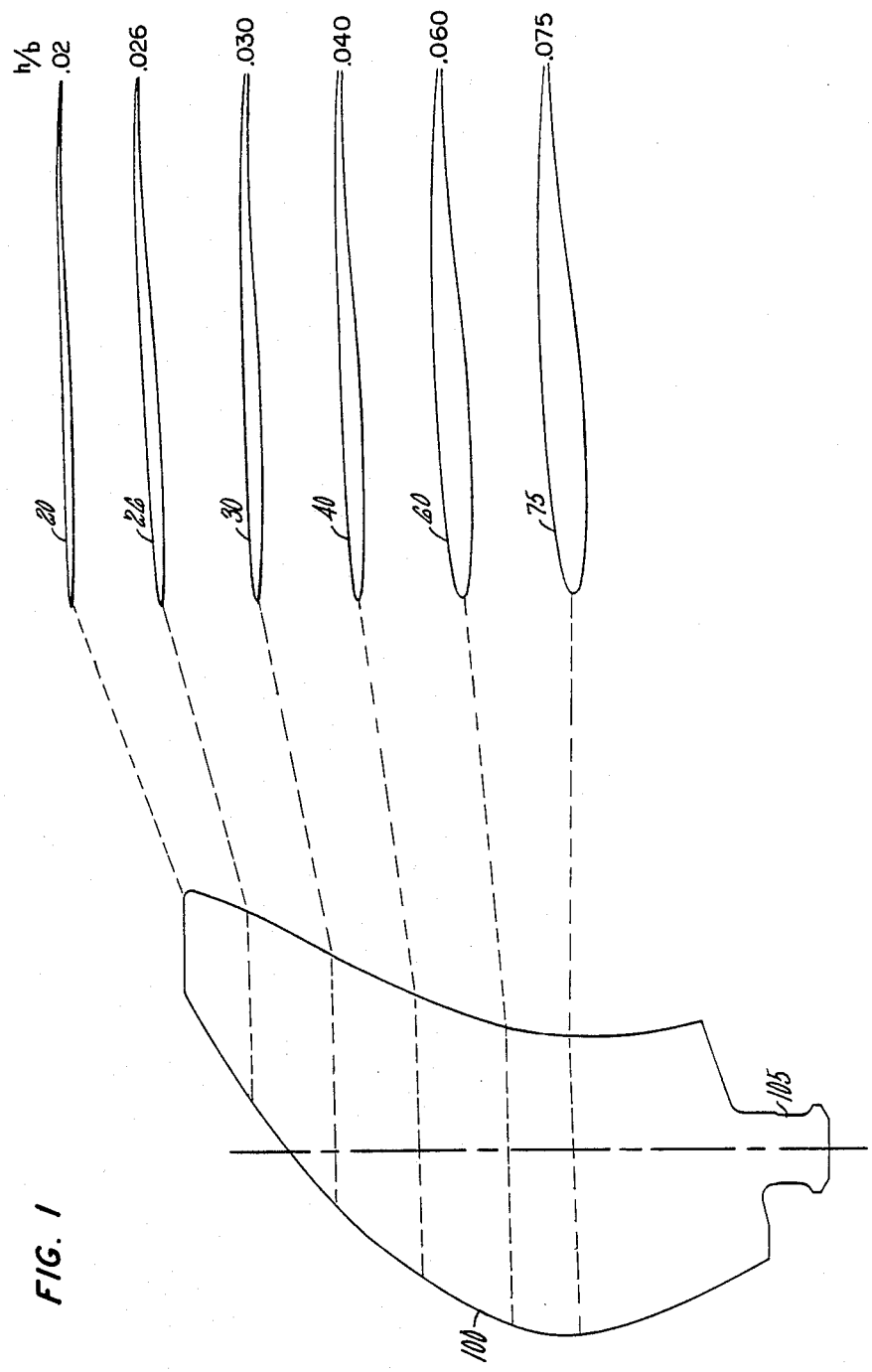
FIG. 1 is a Series of cross-sectional elevations of the airfoil of the present invention and a plan view of a blade showing exemplary locations, along the blade axis of those sections, various of the airfoils being enlarged to show details of the shape thereof.
Figure 2:
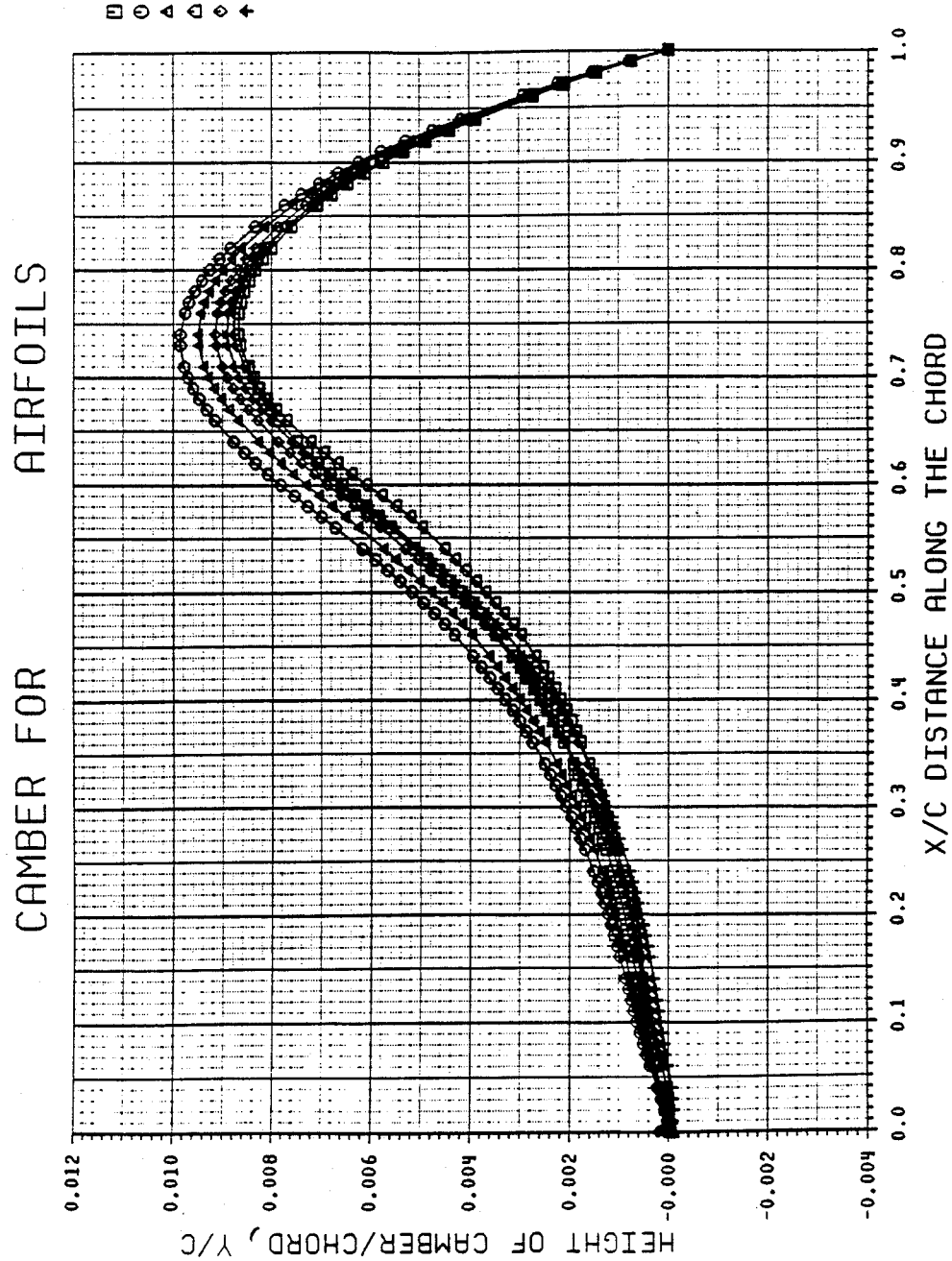
FIG. 2 is a graphical representation of the camber lines of the airfoil sections of the present invention, x/c being indicative of dimensionless locations on the chord line, y/c being indicative of the dimensionless height of the camber line from the airfoil chord.
Figure 3:
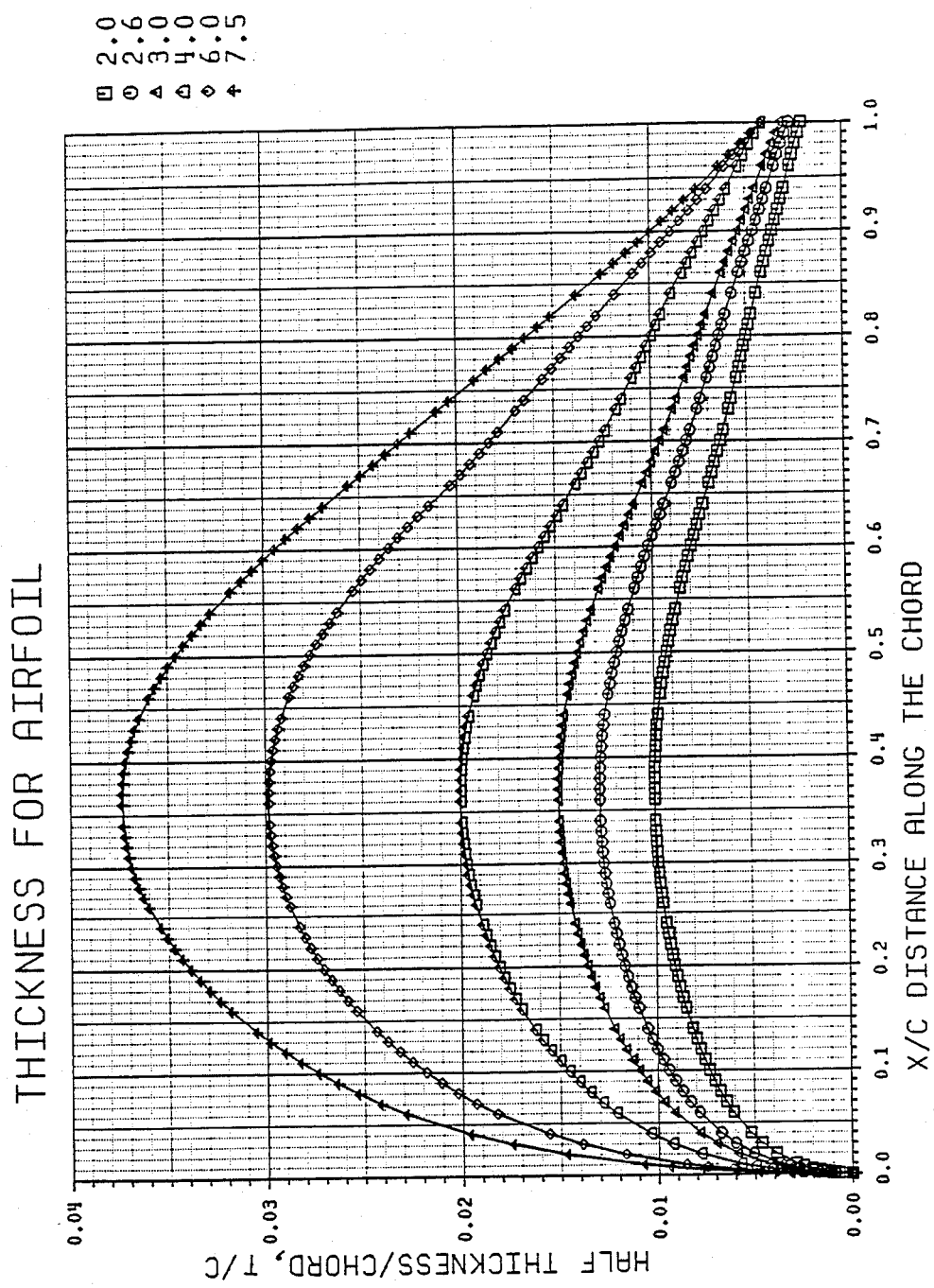
FIG. 3 is a graphical representation of the thickness of the airfoil sections of the present invention, t/c being the dimensionless thickness of the airfoils at corresponding chord locations, x/c.

Referring to FIG. 1, a Series of cross-sections of the airfoil blade 100 of the present invention is shown. Each cross-section is identified by inditia comprising two numerals equal to the thickness ratio (thickness/length) multiplied by 1000. Thus, for example, the upper most airfoil section 20 is characterized by a thickness ratio of 0.02, the second airfoil section 26 having a thickness ratio of 0.026, the third airfoil section 30 having a thickness ratio of 0.030, the fourth airfoil section having a thickness ratio of 0.040, the fifth airfoil section 60 having a thickness ratio of 0.060 and the sixth airfoil section 75 having a thickness ratio of 0.075. Still referring to FIG. 1, it is seen that the 20 airfoil cross-section is taking substantially at the tip of the blade, the 26 airfoil cross-section is taken at a location approximately 0.85 of the length of the blade longitudinal axis from the root portion 105 thereof. The 30 cross-section is taken at location approximately 0.75 of the length of the blade longitudinal axis from the root portion. Similarly, the 40 cross-section is taken at approximately 0.65 of the length, the 60 cross-section is taken at approximately 0.45 of the length, and the 75 section is taken at approximately 0.35 of the length of the blade longitudinal axis from the root portion. It will of course be understood that while the chords of the airfoil sections are illustrated as being of a common length, design considerations regarding blade taper will dictate the relative sizes of the airfoil sections and the present invention shall not be limited to any specific size relationship between the airfoil sections.

Cross-sections of the blade between the airfoil sections shown in FIG. 1 are defined by a transition surface connecting corresponding portions between any two adjacent airfoil shapes as is well known in the art. The airfoil cross-sections will, of course, be angularly displaced from one another in a manner well known in the art to import sufficient twist to the blade to establish varying blade angles of attack dictated by aerodynamic performance requirements.

The following tables list precise dimensionless coordinates of a number of airfoil sections of the blade of the present invention. The x/c values are dimensionless locations on the blade chord line. The y/c upper are the dimensionless heights from the chord line to points on a blade suction surface. The y/c lower are the dimensionless heights from the chord line to points on a blade pressure surface.

20 Airfoil Section

| X/C | Y/C (UPPER) | Y/C (LOWER) | X/C | Y/C (UPPER) | Y/C (LOWER) |
|---|---|---|---|---|---|
| 0.00000 | 0.00000 | 0.00000 | 0.47000 | 0.01229 | −0.00500 |
| 0.00050 | 0.00064 | −0.00064 | 0.48000 | 0.01238 | −0.00471 |
| 0.00100 | 0.00090 | −0.00090 | 0.49000 | 0.01247 | −0.00441 |
| 0.00200 | 0.00127 | −0.00127 | 0.50000 | 0.01257 | −0.00409 |
| 0.00300 | 0.00155 | −0.00155 | 0.51000 | 0.01266 | −0.00376 |
| 0.00500 | 0.00199 | −0.00197 | 0.52000 | 0.01275 | −0.00341 |
| 0.00750 | 0.00241 | −0.00238 | 0.53000 | 0.01284 | −0.00305 |
| 0.01000 | 0.00276 | −0.00271 | 0.54000 | 0.01294 | −0.00268 |
| 0.02000 | 0.00379 | −0.00366 | 0.56000 | 0.01312 | −0.00190 |
| 0.03000 | 0.00454 | −0.00429 | 0.57000 | 0.01320 | −0.00149 |
| 0.04000 | 0.00513 | −0.00477 | 0.58000 | 0.01328 | −0.00109 |
| 0.06000 | 0.00606 | −0.00548 | 0.59000 | 0.01336 | −0.00067 |
| 0.07000 | 0.00644 | −0.00575 | 0.60000 | 0.01343 | −0.00026 |
| 0.08000 | 0.00678 | −0.00599 | 0.61000 | 0.01350 | 0.00015 |
| 0.09000 | 0.00709 | −0.00620 | 0.62000 | 0.01356 | 0.00056 |
| 0.10000 | 0.00737 | −0.00640 | 0.63000 | 0.01361 | 0.00096 |
| 0.11000 | 0.00763 | −0.00657 | 0.64000 | 0.01364 | 0.00135 |
| 0.12000 | 0.00786 | −0.00673 | 0.66000 | 0.01365 | 0.00208 |
| 0.13000 | 0.00809 | −0.00688 | 0.67000 | 0.01362 | 0.00242 |
| 0.14000 | 0.00830 | −0.00701 | 0.68000 | 0.01358 | 0.00274 |
| 0.16000 | 0.00868 | −0.00724 | 0.69000 | 0.01351 | 0.00303 |
| 0.17000 | 0.00886 | −0.00733 | 0.70000 | 0.01344 | 0.00330 |
| 0.18000 | 0.00903 | −0.00741 | 0.71000 | 0.01343 | 0.00353 |
| 0.19000 | 0.00920 | −0.00749 | 0.73000 | 0.01336 | 0.00392 |
| 0.20000 | 0.00935 | −0.00755 | 0.74000 | 0.01330 | 0.00407 |
| 0.21000 | 0.00950 | −0.00761 | 0.76000 | 0.01308 | 0.00428 |
| 0.22000 | 0.00965 | −0.00765 | 0.77000 | 0.01294 | 0.00433 |
| 0.23000 | 0.00979 | −0.00767 | 0.78000 | 0.01277 | 0.00435 |
| 0.24000 | 0.00993 | −0.00769 | 0.79000 | 0.01258 | 0.00435 |
| 0.26000 | 0.01020 | −0.00769 | 0.80000 | 0.01236 | 0.00431 |
| 0.27000 | 0.01033 | −0.00767 | 0.81000 | 0.01211 | 0.00426 |
| 0.28000 | 0.01045 | −0.00764 | 0.82000 | 0.01184 | 0.00418 |
| 0.29000 | 0.01058 | −0.00760 | 0.84000 | 0.01123 | 0.00395 |
| 0.30000 | 0.01069 | −0.00755 | 0.86000 | 0.01051 | 0.00363 |
| 0.31000 | 0.01080 | −0.00749 | 0.87000 | 0.01011 | 0.00344 |
| 0.32000 | 0.01091 | −0.00743 | 0.88000 | 0.00969 | 0.00322 |
| 0.33000 | 0.01102 | −0.00735 | 0.89000 | 0.00924 | 0.00298 |
| 0.34000 | 0.01112 | −0.00727 | 0.90000 | 0.00876 | 0.00271 |
| 0.36000 | 0.01132 | −0.00707 | 0.91000 | 0.00826 | 0.00241 |
| 0.37000 | 0.01141 | −0.00695 | 0.92000 | 0.00771 | 0.00206 |
| 0.38000 | 0.01151 | −0.00682 | 0.93000 | 0.00713 | 0.00166 |
| 0.39000 | 0.01160 | −0.00668 | 0.94000 | 0.00651 | 0.00123 |
| 0.40000 | 0.01169 | −0.00652 | 0.96000 | 0.00518 | 0.00025 |
| 0.41000 | 0.01178 | −0.00635 | 0.97000 | 0.00447 | −0.00029 |
| 0.42000 | 0.01187 | −0.00616 | 0.98000 | 0.00373 | −0.00085 |
| 0.43000 | 0.01195 | −0.00596 | 0.99000 | 0.00294 | −0.00145 |
| 0.44000 | 0.01204 | −0.00575 | 1.00000 | 0.00210 | −0.00210 |
| 0.46000 | 0.01221 | −0.00527 | | | |

26 Airfoil Section

| X/C | Y/C (UPPER) | Y/C (LOWER) | X/C | Y/C (UPPER) | Y/C (LOWER) |
|---|---|---|---|---|---|
| 0.00000 | 0.00000 | 0.00000 | 0.47000 | 0.01773 | −0.00867 |
| 0.00050 | 0.00090 | −0.00089 | 0.48000 | 0.01784 | −0.00836 |
| 0.00100 | 0.00127 | −0.00126 | 0.49000 | 0.01795 | −0.00803 |
| 0.00200 | 0.00178 | −0.00177 | 0.50000 | 0.01806 | −0.00768 |
| 0.00300 | 0.00218 | −0.00215 | 0.51000 | 0.01816 | −0.00731 |
| 0.00500 | 0.00279 | −0.00275 | 0.52000 | 0.01827 | −0.00693 |
| 0.00750 | 0.00338 | −0.00332 | 0.53000 | 0.01838 | −0.00653 |
| 0.01000 | 0.00387 | −0.00379 | 0.54000 | 0.01848 | −0.00611 |
| 0.02000 | 0.00533 | −0.00512 | 0.56000 | 0.01869 | −0.00524 |
| 0.03000 | 0.00638 | −0.00604 | 0.57000 | 0.01879 | −0.00479 |
| 0.04000 | 0.00722 | −0.00674 | 0.58000 | 0.01888 | −0.00434 |
| 0.06000 | 0.00855 | −0.00777 | 0.59000 | 0.01897 | −0.00387 |
| 0.07000 | 0.00910 | −0.00818 | 0.60000 | 0.01905 | −0.00341 |
| 0.08000 | 0.00959 | −0.00854 | 0.61000 | 0.01912 | −0.00295 |
| 0.09000 | 0.01004 | −0.00886 | 0.62000 | 0.01917 | −0.00248 |
| 0.10000 | 0.01046 | −0.00915 | 0.63000 | 0.01918 | −0.00203 |
| 0.11000 | 0.01084 | −0.00942 | 0.64000 | 0.01916 | −0.00159 |
| 0.12000 | 0.01119 | −0.00966 | 0.66000 | 0.01908 | −0.00075 |
| 0.13000 | 0.01153 | −0.00989 | 0.67000 | 0.01902 | −0.00035 |
| 0.14000 | 0.01184 | −0.01010 | 0.68000 | 0.01894 | 0.00002 |
| 0.16000 | 0.01243 | −0.01045 | 0.69000 | 0.01884 | 0.00037 |
| 0.17000 | 0.01270 | −0.01061 | 0.70000 | 0.01873 | 0.00069 |
| 0.18000 | 0.01296 | −0.01075 | 0.71000 | 0.01859 | 0.00098 |
| 0.19000 | 0.01321 | −0.01087 | 0.73000 | 0.01825 | 0.00148 |
| 0.20000 | 0.01345 | −0.01098 | 0.74000 | 0.01805 | 0.00168 |
| 0.21000 | 0.01368 | −0.01108 | 0.76000 | 0.01757 | 0.00198 |
| 0.22000 | 0.01390 | −0.01116 | 0.77000 | 0.01729 | 0.00209 |
| 0.23000 | 0.01412 | −0.01123 | 0.78000 | 0.01699 | 0.00216 |
| 0.24000 | 0.01433 | −0.01128 | 0.79000 | 0.01665 | 0.00220 |
| 0.26000 | 0.01474 | −0.01134 | 0.80000 | 0.01630 | 0.00223 |
| 0.27000 | 0.01493 | −0.01136 | 0.81000 | 0.01591 | 0.00222 |
| 0.28000 | 0.01512 | −0.01135 | 0.82000 | 0.01550 | 0.00220 |
| 0.29000 | 0.01530 | −0.01134 | 0.84000 | 0.01460 | 0.00209 |
| 0.30000 | 0.01547 | −0.01131 | 0.86000 | 0.01359 | 0.00189 |
| 0.31000 | 0.01564 | −0.01127 | 0.87000 | 0.01304 | 0.00177 |
| 0.32000 | 0.01580 | −0.01121 | 0.88000 | 0.01246 | 0.00162 |
| 0.33000 | 0.01595 | −0.01115 | 0.89000 | 0.01185 | 0.00145 |
| 0.34000 | 0.01610 | −0.01108 | 0.90000 | 0.01121 | 0.00125 |
| 0.36000 | 0.01639 | −0.01088 | 0.91000 | 0.01054 | 0.00102 |
| 0.37000 | 0.01653 | −0.01076 | 0.92000 | 0.00982 | 0.00074 |
| 0.38000 | 0.01667 | −0.01063 | 0.93000 | 0.00907 | 0.00042 |
| 0.39000 | 0.01680 | −0.01049 | 0.94000 | 0.00828 | 0.00006 |
| 0.40000 | 0.01693 | −0.01032 | 0.96000 | 0.00659 | −0.00077 |
| 0.41000 | 0.01705 | −0.01014 | 0.97000 | 0.00569 | −0.00122 |
| 0.42000 | 0.01717 | −0.00994 | 0.98000 | 0.00476 | −0.00169 |
| 0.43000 | 0.01729 | −0.00972 | 0.99000 | 0.00378 | −0.00219 |
| 0.44000 | 0.01740 | −0.00949 | 1.00000 | 0.00273 | −0.00273 |
| 0.46000 | 0.01762 | −0.00896 | | | |

30 Airfoil Section

| X/C | Y/C (UPPER) | Y/C (LOWER) | X/C | Y/C (UPPER) | Y/C (LOWER) |
|---|---|---|---|---|---|
| 0.00000 | −0.00002 | −0.00002 | 0.47000 | 0.01841 | −0.01011 |
| 0.00050 | 0.00101 | −0.00100 | 0.48000 | 0.01849 | −0.00978 |
| 0.00100 | 0.00142 | −0.00141 | 0.49000 | 0.01856 | −0.00943 |
| 0.00200 | 0.00199 | −0.00198 | 0.50000 | 0.01863 | −0.00905 |
| 0.00300 | 0.00243 | −0.00241 | 0.51000 | 0.01869 | −0.00866 |
| 0.00500 | 0.00311 | −0.00308 | 0.52000 | 0.01875 | −0.00825 |
| 0.00750 | 0.00378 | −0.00372 | 0.53000 | 0.01881 | −0.00783 |
| 0.01000 | 0.00432 | −0.00425 | 0.54000 | 0.01887 | −0.00739 |
| 0.02000 | 0.00593 | −0.00575 | 0.56000 | 0.01897 | −0.00646 |
| 0.03000 | 0.00708 | −0.00677 | 0.57000 | 0.01902 | −0.00599 |
| 0.04000 | 0.00800 | −0.00756 | 0.58000 | 0.01905 | −0.00550 |
| 0.06000 | 0.00944 | −0.00874 | 0.59000 | 0.01909 | −0.00501 |
| 0.07000 | 0.01003 | −0.00920 | 0.60000 | 0.01911 | −0.00452 |
| 0.08000 | 0.01056 | −0.00961 | 0.61000 | 0.01913 | −0.00402 |
| 0.09000 | 0.01103 | −0.00997 | 0.62000 | 0.01914 | −0.00353 |
| 0.10000 | 0.01147 | −0.01031 | 0.63000 | 0.01914 | −0.00305 |
| 0.11000 | 0.01188 | −0.01061 | 0.64000 | 0.01912 | −0.00258 |
| 0.12000 | 0.01225 | −0.01089 | 0.66000 | 0.01905 | −0.00168 |
| 0.13000 | 0.01261 | −0.01115 | 0.67000 | 0.01899 | −0.00125 |
| 0.14000 | 0.01294 | −0.01138 | 0.68000 | 0.01892 | −0.00086 |
| 0.16000 | 0.01354 | −0.01179 | 0.69000 | 0.01883 | −0.00048 |
| 0.17000 | 0.01382 | −0.01197 | 0.70000 | 0.01872 | −0.00014 |
| 0.18000 | 0.01409 | −0.01213 | 0.71000 | 0.01859 | 0.00018 |
| 0.19000 | 0.01434 | −0.01227 | 0.73000 | 0.01826 | 0.00072 |
| 0.20000 | 0.01458 | −0.01241 | 0.74000 | 0.01806 | 0.00094 |
| 0.21000 | 0.01481 | −0.01252 | 0.76000 | 0.01761 | 0.00128 |
| 0.22000 | 0.01504 | −0.01262 | 0.77000 | 0.01734 | 0.00140 |
| 0.23000 | 0.01526 | −0.01270 | 0.78000 | 0.01705 | 0.00150 |
| 0.24000 | 0.01546 | −0.01277 | 0.79000 | 0.01673 | 0.00156 |
| 0.26000 | 0.01586 | −0.01286 | 0.80000 | 0.01639 | 0.00160 |
| 0.27000 | 0.01605 | −0.01288 | 0.81000 | 0.01602 | 0.00161 |
| 0.28000 | 0.01623 | −0.01288 | 0.82000 | 0.01562 | 0.00160 |
| 0.29000 | 0.01639 | −0.01287 | 0.84000 | 0.01475 | 0.00152 |
| 0.30000 | 0.01656 | −0.01285 | 0.86000 | 0.01376 | 0.00135 |
| 0.31000 | 0.01671 | −0.01280 | 0.87000 | 0.01322 | 0.00124 |
| 0.32000 | 0.01686 | −0.01275 | 0.88000 | 0.01265 | 0.00111 |
| 0.33000 | 0.01700 | −0.01269 | 0.89000 | 0.01206 | 0.00095 |
| 0.34000 | 0.01713 | −0.01261 | 0.90000 | 0.01143 | 0.00076 |
| 0.36000 | 0.01739 | −0.01242 | 0.91000 | 0.01077 | 0.00054 |

30 Airfoil Section -continued

| X/C | Y/C (UPPER) | Y/C (LOWER) | X/C | Y/C (UPPER) | Y/C (LOWER) |
|---|---|---|---|---|---|
| 0.37000 | 0.01751 | −0.01230 | 0.92000 | 0.01007 | 0.00027 |
| 0.38000 | 0.01763 | −0.01216 | 0.93000 | 0.00934 | −0.00004 |
| 0.39000 | 0.01774 | −0.01201 | 0.94000 | 0.00856 | −0.00039 |
| 0.40000 | 0.01784 | −0.01184 | 0.96000 | 0.00692 | −0.00120 |
| 0.41000 | 0.01794 | −0.01165 | 0.97000 | 0.00604 | −0.00165 |
| 0.42000 | 0.01803 | −0.01144 | 0.98000 | 0.00513 | −0.00211 |
| 0.43000 | 0.01811 | −0.01122 | 0.99000 | 0.00417 | −0.00261 |
| 0.44000 | 0.01819 | −0.01097 | 1.00000 | 0.00315 | −0.00315 |
| 0.46000 | 0.01834 | −0.01042 | | | |

40 Airfoil Section

| X/C | Y/C (UPPER) | Y/C (LOWER) | X/C | Y/C (UPPER) | Y/C (LOWER) |
|---|---|---|---|---|---|
| 0.00000 | 0.00000 | 0.00000 | 0.47000 | 0.02016 | −0.01384 |
| 0.00050 | 0.00130 | −0.00128 | 0.48000 | 0.02014 | −0.01347 |
| 0.00100 | 0.00181 | −0.00179 | 0.49000 | 0.02010 | −0.01308 |
| 0.00200 | 0.00254 | −0.00252 | 0.50000 | 0.02006 | −0.01266 |
| 0.00300 | 0.00310 | −0.00307 | 0.51000 | 0.02002 | −0.01222 |
| 0.00500 | 0.00396 | −0.00392 | 0.52000 | 0.01996 | −0.01176 |
| 0.00750 | 0.00480 | −0.00475 | 0.53000 | 0.01990 | −0.01127 |
| 0.01000 | 0.00548 | −0.00542 | 0.54000 | 0.01984 | −0.01077 |
| 0.02000 | 0.00749 | −0.00734 | 0.56000 | 0.01969 | −0.00972 |
| 0.03000 | 0.00891 | −0.00866 | 0.57000 | 0.01963 | −0.00918 |
| 0.04000 | 0.01002 | −0.00967 | 0.58000 | 0.01965 | −0.00862 |
| 0.06000 | 0.01174 | −0.01120 | 0.59000 | 0.01968 | −0.00807 |
| 0.07000 | 0.01244 | −0.01180 | 0.60000 | 0.01971 | −0.00750 |
| 0.08000 | 0.01306 | −0.01232 | 0.61000 | 0.01973 | −0.00693 |
| 0.09000 | 0.01361 | −0.01280 | 0.62000 | 0.01974 | −0.00636 |
| 0.10000 | 0.01412 | −0.01323 | 0.63000 | 0.01973 | −0.00580 |
| 0.11000 | 0.01458 | −0.01363 | 0.64000 | 0.01971 | −0.00526 |
| 0.12000 | 0.01501 | −0.01400 | 0.66000 | 0.01963 | −0.00422 |
| 0.13000 | 0.01540 | −0.01434 | 0.67000 | 0.01957 | −0.00373 |
| 0.14000 | 0.01577 | −0.01465 | 0.68000 | 0.01949 | −0.00326 |
| 0.16000 | 0.01643 | −0.01519 | 0.69000 | 0.01939 | −0.00282 |
| 0.17000 | 0.01673 | −0.01543 | 0.70000 | 0.01928 | −0.00241 |
| 0.18000 | 0.01702 | −0.01564 | 0.71000 | 0.01915 | −0.00203 |
| 0.19000 | 0.01728 | −0.01584 | 0.73000 | 0.01884 | −0.00137 |
| 0.20000 | 0.01753 | −0.01602 | 0.74000 | 0.01865 | −0.00110 |
| 0.21000 | 0.01777 | −0.01618 | 0.76000 | 0.01820 | −0.00065 |
| 0.22000 | 0.01799 | −0.01632 | 0.77000 | 0.01794 | −0.00048 |
| 0.23000 | 0.01820 | −0.01644 | 0.78000 | 0.01767 | −0.00034 |
| 0.24000 | 0.01840 | −0.01654 | 0.79000 | 0.01736 | −0.00024 |
| 0.26000 | 0.01877 | −0.01668 | 0.80000 | 0.01703 | −0.00016 |
| 0.27000 | 0.01895 | −0.01673 | 0.81000 | 0.01668 | −0.00010 |
| 0.28000 | 0.01910 | −0.01676 | 0.82000 | 0.01630 | −0.00007 |
| 0.29000 | 0.01925 | −0.01677 | 0.84000 | 0.01545 | −0.00007 |
| 0.30000 | 0.01938 | −0.01676 | 0.86000 | 0.01449 | −0.00014 |
| 0.31000 | 0.01950 | −0.01673 | 0.87000 | 0.11396 | −0.00021 |
| 0.32000 | 0.01961 | −0.01669 | 0.88000 | 0.01341 | −0.00030 |
| 0.33000 | 0.01971 | −0.01664 | 0.89000 | 0.01282 | −0.00041 |
| 0.34000 | 0.01980 | −0.01657 | 0.90000 | 0.01221 | −0.00055 |
| 0.36000 | 0.01995 | −0.01637 | 0.91000 | 0.01157 | −0.00073 |
| 0.37000 | 0.02002 | −0.01625 | 0.92000 | 0.01090 | −0.00096 |
| 0.38000 | 0.02008 | −0.01611 | 0.93000 | 0.01018 | −0.00124 |
| 0.39000 | 0.02013 | −0.01595 | 0.94000 | 0.00943 | −0.00156 |
| 0.40000 | 0.02016 | −0.01576 | 0.96000 | 0.00784 | −0.00231 |
| 0.41000 | 0.02019 | −0.01556 | 0.97000 | 0.00700 | −0.00274 |
| 0.42000 | 0.02021 | −0.01533 | 0.98000 | 0.00612 | −0.00319 |
| 0.43000 | 0.02022 | −0.01508 | 0.99000 | 0.00520 | −0.00367 |
| 0.44000 | 0.02021 | −0.01480 | 1.00000 | 0.00419 | −0.00419 |
| 0.46000 | 0.02019 | −0.01419 | | | |

60 Airfoil Section

| X/C | Y/C (UPPER) | Y/C (LOWER) | X/C | Y/C (UPPER) | Y/C (LOWER) |
|---|---|---|---|---|---|
| 0.00000 | 0.00008 | 0.00008 | 0.47000 | 0.03246 | −0.02501 |
| 0.00050 | 0.00192 | −0.00194 | 0.48000 | 0.03239 | −0.02455 |
| 0.00100 | 0.00275 | −0.00278 | 0.49000 | 0.03232 | −0.02406 |

60 Airfoil Section -continued

| X/C | Y/C (UPPER) | Y/C (LOWER) | X/C | Y/C (UPPER) | Y/C (LOWER) |
|---|---|---|---|---|---|
| 0.00200 | 0.00391 | −0.00396 | 0.50000 | 0.03223 | −0.02354 |
| 0.00300 | 0.00479 | −0.00486 | 0.51000 | 0.03212 | −0.02298 |
| 0.00500 | 0.00616 | −0.00625 | 0.52000 | 0.03201 | −0.02240 |
| 0.00750 | 0.00748 | −0.00758 | 0.53000 | 0.03189 | −0.02179 |
| 0.01000 | 0.00856 | −0.00866 | 0.54000 | 0.03175 | −0.02115 |
| 0.02000 | 0.01172 | −0.01178 | 0.56000 | 0.03143 | −0.01981 |
| 0.03000 | 0.01396 | −0.01395 | 0.57000 | 0.03125 | −0.01911 |
| 0.04000 | 0.01573 | −0.01563 | 0.58000 | 0.03105 | −0.01840 |
| 0.06000 | 0.01847 | −0.01818 | 0.59000 | 0.03085 | −0.01767 |
| 0.07000 | 0.01958 | −0.01919 | 0.60000 | 0.03064 | −0.01692 |
| 0.08000 | 0.02057 | −0.02009 | 0.61000 | 0.03041 | −0.01616 |
| 0.09000 | 0.02146 | −0.02090 | 0.62000 | 0.03014 | −0.01538 |
| 0.10000 | 0.02228 | −0.02163 | 0.63000 | 0.02984 | −0.01459 |
| 0.11000 | 0.02303 | −0.02231 | 0.64000 | 0.02951 | −0.01380 |
| 0.12000 | 0.02373 | −0.02293 | 0.66000 | 0.02883 | −0.01227 |
| 0.13000 | 0.02438 | −0.02350 | 0.67000 | 0.02848 | −0.01154 |
| 0.14000 | 0.02499 | −0.02403 | 0.68000 | 0.02814 | −0.01086 |
| 0.16000 | 0.02610 | −0.02497 | 0.69000 | 0.02779 | −0.01021 |
| 0.17000 | 0.02661 | −0.02539 | 0.70000 | 0.02744 | −0.00961 |
| 0.18000 | 0.02708 | −0.02577 | 0.71000 | 0.02706 | −0.00904 |
| 0.19000 | 0.02754 | −0.02613 | 0.73000 | 0.02625 | −0.00799 |
| 0.20000 | 0.02797 | −0.02646 | 0.74000 | 0.02581 | −0.00750 |
| 0.21000 | 0.02837 | −0.02676 | 0.76000 | 0.02483 | −0.00661 |
| 0.22000 | 0.02875 | −0.02702 | 0.77000 | 0.02430 | −0.00620 |
| 0.23000 | 0.02912 | −0.02726 | 0.78000 | 0.02374 | −0.00582 |
| 0.24000 | 0.02946 | −0.02747 | 0.79000 | 0.02315 | −0.00547 |
| 0.26000 | 0.03009 | −0.02781 | 0.80000 | 0.02254 | −0.00514 |
| 0.27000 | 0.03038 | −0.02794 | 0.81000 | 0.02190 | −0.00484 |
| 0.28000 | 0.03065 | −0.02804 | 0.82000 | 0.02124 | −0.00457 |
| 0.29000 | 0.03089 | −0.02811 | 0.84000 | 0.01983 | −0.00407 |
| 0.30000 | 0.03112 | −0.02816 | 0.86000 | 0.01830 | −0.00365 |
| 0.31000 | 0.03133 | −0.02819 | 0.87000 | 0.01749 | −0.00346 |
| 0.32000 | 0.03152 | −0.02819 | 0.88000 | 0.01666 | −0.00330 |
| 0.33000 | 0.03169 | −0.02817 | 0.89000 | 0.01580 | −0.00316 |
| 0.34000 | 0.03185 | −0.02812 | 0.90000 | 0.01491 | −0.00306 |
| 0.36000 | 0.03213 | −0.02795 | 0.91000 | 0.01399 | −0.00300 |
| 0.37000 | 0.03225 | −0.02784 | 0.92000 | 0.01304 | −0.00298 |
| 0.38000 | 0.03235 | −0.02769 | 0.93000 | 0.01205 | −0.00301 |
| 0.39000 | 0.03243 | −0.02752 | 0.94000 | 0.01103 | −0.00308 |
| 0.40000 | 0.03250 | −0.02732 | 0.96000 | 0.00889 | −0.00333 |
| 0.41000 | 0.03254 | −0.02709 | 0.97000 | 0.00778 | −0.00349 |
| 0.42000 | 0.03256 | −0.02682 | 0.98000 | 0.00663 | −0.00369 |
| 0.43000 | 0.03257 | −0.02653 | 0.99000 | 0.00545 | −0.00392 |
| 0.44000 | 0.03256 | −0.02620 | 1.00000 | 0.00422 | −0.00422 |
| 0.46000 | 0.03251 | −0.02544 | | | |

75 Airfoil Section

| X/C | Y/C (UPPER) | Y/C (LOWER) | X/C | Y/C (UPPER) | Y/C (LOWER) |
|---|---|---|---|---|---|
| 0.00000 | 0.00022 | 0.00022 | 0.47000 | 0.03920 | −0.03233 |
| 0.00050 | 0.00228 | −0.00229 | 0.48000 | 0.03907 | −0.03180 |
| 0.00100 | 0.00332 | −0.00336 | 0.49000 | 0.03892 | −0.03124 |
| 0.00200 | 0.00479 | −0.00490 | 0.50000 | 0.03875 | −0.03064 |
| 0.00300 | 0.00593 | −0.00607 | 0.51000 | 0.03856 | −0 03001 |
| 0.00500 | 0.00764 | −0.00781 | 0.52000 | 0.03835 | −0.02933 |
| 0.00750 | 0.00929 | −0.00948 | 0.53000 | 0.03812 | −0.02863 |
| 0.01000 | 0.01064 | −0.01084 | 0.54000 | 0.03788 | −0.02790 |
| 0.02000 | 0.01457 | −0.01478 | 0.56000 | 0.03735 | −0.02635 |
| 0.03000 | 0.01734 | −0.01751 | 0.57000 | 0.03706 | −0.02554 |
| 0.04000 | 0.01952 | −0.01963 | 0.58000 | 0.03675 | −0.02471 |
| 0.06000 | 0.02289 | −0.02284 | 0.59000 | 0.03643 | −0.02387 |
| 0.07000 | 0.02425 | −0.02413 | 0.60000 | 0.03612 | −0.02302 |
| 0.08000 | 0.02546 | −0.02527 | 0.61000 | 0.03578 | −0.02216 |
| 0.09000 | 0.02656 | −0.02629 | 0.62000 | 0.03542 | −0.02128 |
| 0.10000 | 0.02756 | −0.02723 | 0.63000 | 0.03503 | −0.02039 |
| 0.11000 | 0.02848 | −0.02808 | 0.64000 | 0.03460 | −0.01949 |
| 0.12000 | 0.02933 | −0.02887 | 0.66000 | 0.03371 | −0.01773 |
| 0.13000 | 0.03013 | −0.02960 | 0.67000 | 0.03324 | −0.01687 |
| 0.14000 | 0.03088 | −0.03027 | 0.68000 | 0.03276 | −0.01603 |
| 0.16000 | 0.03223 | −0.03148 | 0.69000 | 0.03225 | −0.01522 |
| 0.17000 | 0.03284 | −0.03201 | 0.70000 | 0.03173 | −0.01443 |
| 0.18000 | 0.03342 | −0.03251 | 0.71000 | 0.03118 | −0.01367 |
| 0.19000 | 0.03396 | −0.03296 | 0.73000 | 0.02999 | −0.01222 |

-continued

| 75 Airfoil Section | | | | |
|---|---|---|---|---|
| X/C | Y/C (UPPER) | Y/C (LOWER) | X/C | Y/C (UPPER) | Y/C (LOWER) |
| 0.20000 | 0.03447 | −0.03338 | 0.74000 | 0.02936 | −0.01153 |
| 0.21000 | 0.03496 | −0.03376 | 0.76000 | 0.02802 | −0.01024 |
| 0.22000 | 0.03542 | −0.03411 | 0.77000 | 0.02730 | −0.00963 |
| 0.23000 | 0.03585 | −0.03443 | 0.78000 | 0.02656 | −0.00906 |
| 0.24000 | 0.03626 | −0.03470 | 0.79000 | 0.02580 | −0.00851 |
| 0.26000 | 0.03701 | −0.03516 | 0.80000 | 0.02501 | −0.00798 |
| 0.27000 | 0.03734 | −0.03534 | 0.81000 | 0.02419 | −0.00749 |
| 0.28000 | 0.03765 | −0.03549 | 0.82000 | 0.02335 | −0.00701 |
| 0.29000 | 0.03793 | −0.03560 | 0.84000 | 0.02160 | −0.00614 |
| 0.30000 | 0.03818 | −0.03568 | 0.86000 | 0.01974 | −0.00536 |
| 0.31000 | 0.03841 | −0.03574 | 0.87000 | 0.01877 | −0.00501 |
| 0.32000 | 0.03862 | −0.03576 | 0.88000 | 0.01779 | −0.00469 |
| 0.33000 | 0.03881 | −0.03576 | 0.89000 | 0.01681 | −0.00442 |
| 0.34000 | 0.03898 | −0.03573 | 0.90000 | 0.01580 | −0.00418 |
| 0.36000 | 0.03926 | −0.03559 | 0.91000 | 0.01477 | −0.00399 |
| 0.37000 | 0.03937 | −0.03548 | 0.92000 | 0.01370 | −0.00385 |
| 0.38000 | 0.03946 | −0.03533 | 0.93000 | 0.01260 | −0.00375 |
| 0.39000 | 0.03953 | −0.03514 | 0.94000 | 0.01147 | −0.00368 |
| 0.40000 | 0.03957 | −0.03492 | 0.96000 | 0.00911 | −0.00366 |
| 0.41000 | 0.03959 | −0.03467 | 0.97000 | 0.00790 | −0.00370 |
| 0.42000 | 0.03958 | −0.03438 | 0.98000 | 0.00668 | −0.00380 |
| 0.43000 | 0.03955 | −0.03404 | 0.99000 | 0.00546 | −0.00396 |
| 0.44000 | 0.03950 | −0.03367 | 1.00000 | 0.00421 | −0.00421 |
| 0.46000 | 0.03932 | −0.03281 | | | |

Each airfoil section has a unique location of maximum thickness and camber and when the airfoils are incorporated in a single propeller blade, smooth continuous upper and lower surfaces result.

The airfoils are characterized as follows. Each airfoil has a maximum thickness at approximately 0.36 x/c and a maximum camber at approximately 0.74 x/c. Each of the airfoils is further characterized by a relatively large trailing edge thickness ratio as follows: the 20 section thickness ratio is about 0.0042; the section 26 thickness ratio is about 0.00546; the 30 section thickness ratio is about 0.0063; the 40 section thickness ratio is about 0.00838; the 60 section thickness ratio is about 0.00844; and, the 75 section thickness ratio is about 0.00842.

Figure 4:
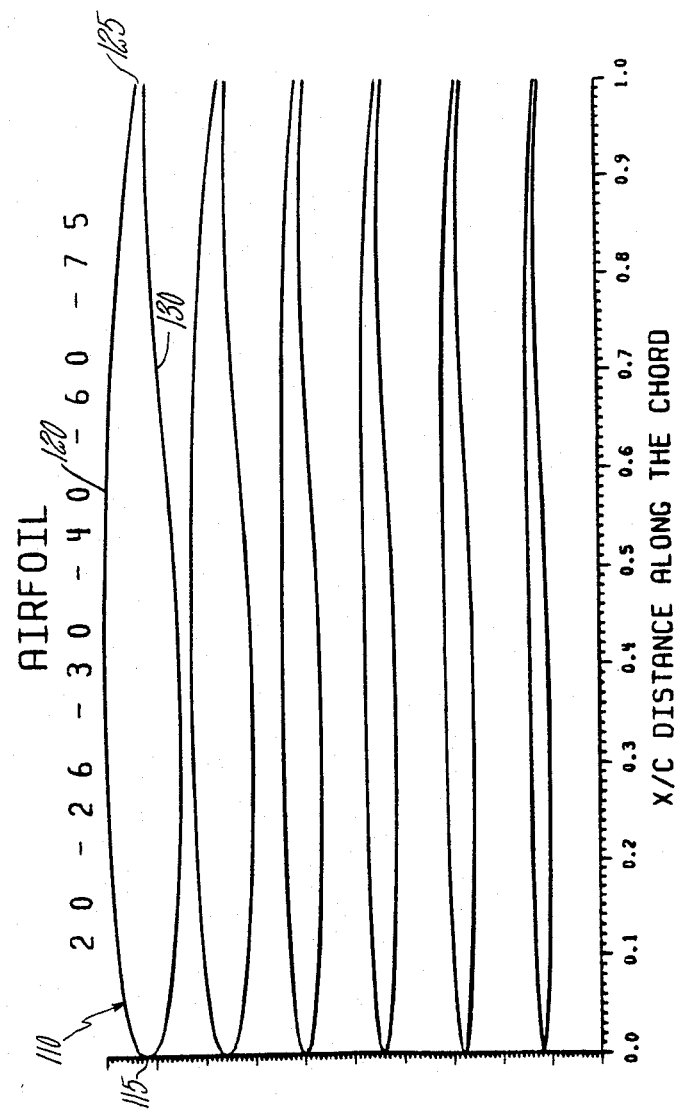
FIG. 4 is a graphical representation of the airfoil sections of the present invention.

From the foregoing and referring to FIG. 4 which illustrates the disclosed airfoil family, it is seen that the airfoils of the present invention are characterized along substantially the entire length of the chord thereby each airfoil shape 110 comprising a rounded generally parabolic leading edge portion 115, a slight camber extending to about the 40% chord, a gradual upper surface pressure recovery surface 120 from the 40% chord to the trailing edge 125, and a concave lower surface 130 from the 40% chord to the trailing edge. The concave lower surface provides the required lift. The relatively large leading edge radii of the leading edge portion 115 compared to the NACA 16 Series leading edge minimizes the foreign object damage while the relatively blunt trailing edges minimizes blade handling problems compared to the NACA 16 Series trailing edges.

Figure 5:
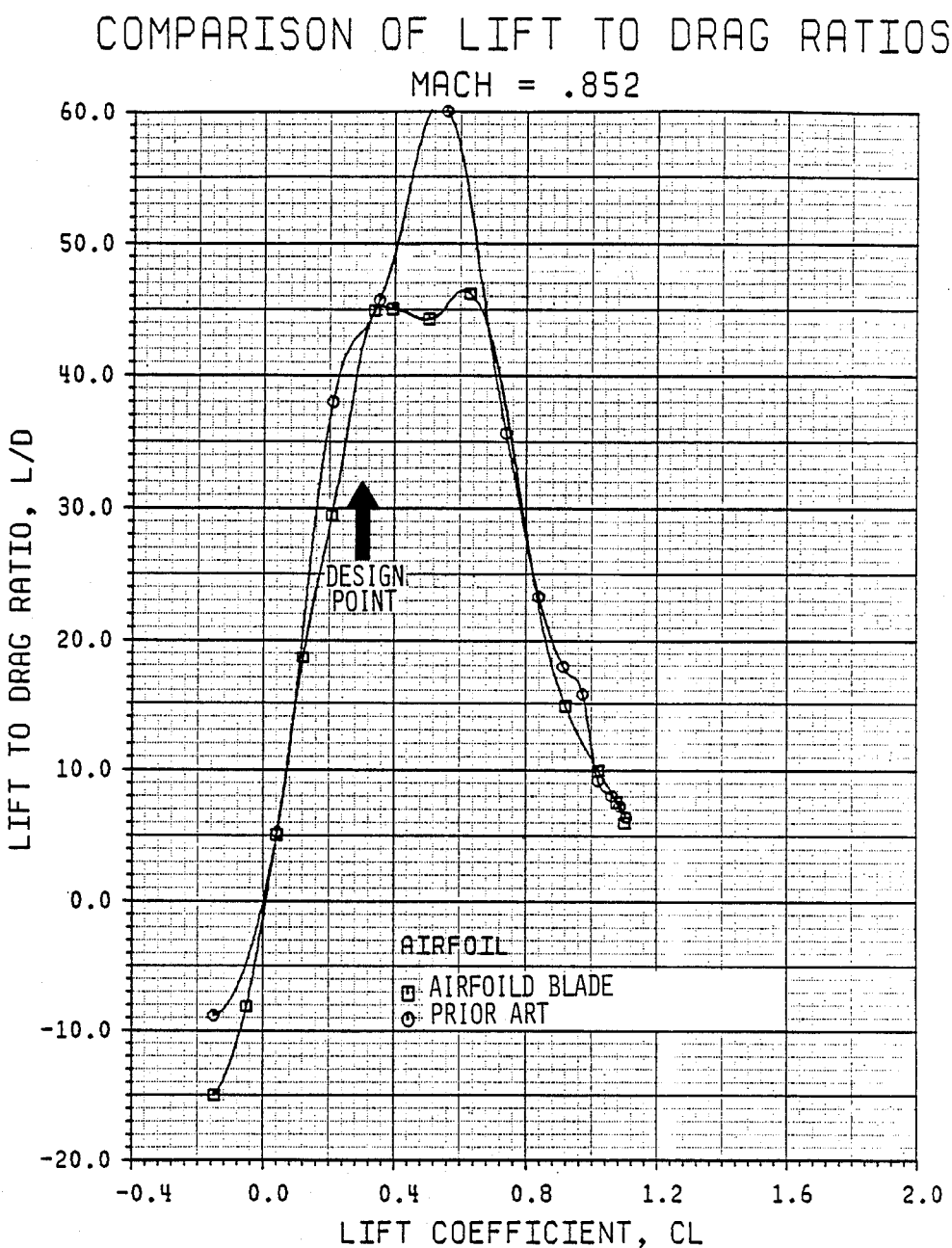
FIG. 5 is a graphical representation of the lift to drag ratios of the airfoil sections of the present invention and prior art NACA Series 16 airfoil sections.
Figure 6:
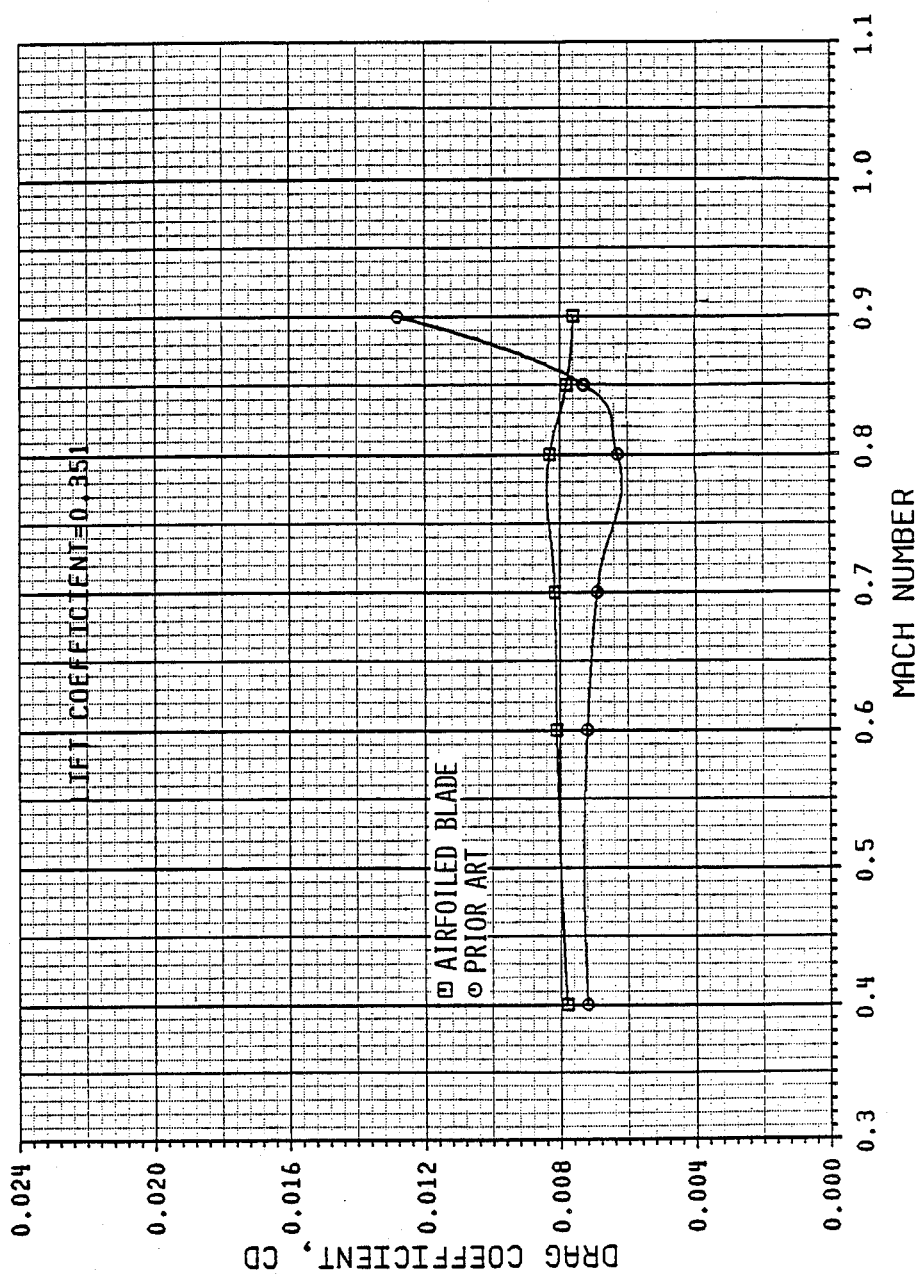
FIG. 6 is a graphical comparison of the drag rise of the airfoil sections of the present invention and prior art NACA Series 16 airfoil sections.

The performance of the blade incorporating the airfoils of the present invention is compared with performance of a blade incorporating conventional NACA Series 16 airfoils in FIGS. 5 and 6. As shown in FIG. 5 at the design lift coefficient for each airfoil cross-section of 0.351 and at a cruise of Mach 0.852, the present invention provides essentially equal performance at the design point to the NACA 16 airfoil blade. Moreover, the differences in lift to drag ratio L/D beyond the design lift coefficient, when incorporated in propeller performance calculations, result in negligible losses. In addition, as shown in FIG. 6, the new airfoil can be operated at even higher Mach numbers with improved performance. Note how the NACA Series 16 airfoil shows remarkable increase in the drag coefficient above Mach number 0.85 while the airfoils of the invention show a decrease in drag coefficient.

Because of the unique shapes, these airfoils after the following advantage over conventional airfoils. A thicker prop fan propeller blade can be designed and manufactured with essentially minimal loss in performance at the design point. As a result, the manufacture is easier and the blade may be strengthened and manufactured more easily. The relatively large leading edge radii minimizes foreign object damage. The relatively blunt trailing edge minimizes blade handling problems. Additionally, large leading edges are easier to manufacturer.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

Having thus described the invention what is claimed is:

1. A blade having a plurality of airfoil sections, each section having along substantially the entire length thereof a cross-sectional shape, said blade comprising:
   each cross-sectional shape having a parabolic leading edge, a slight camber extending from the leading edge to about a 40% chord, a gradual upper surface pressure recovery surface from the about 40% chord to a trailing edge and a concave lower surface from about the 40% chord to the trailing edge to generate lift, said pressure and suction surfaces merging into a relatively blunt trailing edge, a maximum thickness at approximately 0.36 x/c and a maximum camber at approximately 0.74 x/c, wherein x/c is a dimensionless length along a .chord of each of said cross-sectional shapes;
   one of said cross-sectional shapes having a thickness ratio of 0.02, another of said cross-sectional shapes having a thickness ratio of 0.026, another of said cross-sectional shapes having a thickness ratio of 0.03, another of said cross-sectional shapes having a thickness ratio of 0.04, another of said cross-sectional shapes having a thickness ratio of 0.06, and another of said cross-sectional shapes having a thickness ratio of 0.075.

* * * * *